US008010838B2

(12) United States Patent
Bailey et al.

(10) Patent No.: US 8,010,838 B2
(45) Date of Patent: Aug. 30, 2011

(54) HARDWARE RECOVERY RESPONSIVE TO CONCURRENT MAINTENANCE

(75) Inventors: Sheldon Ray Bailey, Rochester, MN (US); Bradley W. Bishop, Rochester, MN (US); Alongkorn Kitamorn, Austin, TX (US); Erlander Lo, Austin, TX (US); Allegra R. Segura, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 300 days.

(21) Appl. No.: 12/274,434

(22) Filed: Nov. 20, 2008

(65) Prior Publication Data

US 2010/0125747 A1    May 20, 2010

(51) Int. Cl.
*G06F 11/00* (2006.01)
(52) U.S. Cl. .......................................... 714/10
(58) Field of Classification Search ...................... 714/10
See application file for complete search history.

(56) References Cited

U.S. PATENT DOCUMENTS

| 5,293,556 | A  | * | 3/1994  | Hill et al. ..................... 702/184 |
| 5,579,491 | A  | * | 11/1996 | Jeffries et al. ................. 710/302 |
| 5,978,938 | A  | * | 11/1999 | Kaiser et al. .................... 714/48 |
| 6,247,080 | B1 | * | 6/2001  | Wallach et al. ................. 710/302 |
| 6,523,140 | B1 | * | 2/2003  | Arndt et al. ....................... 714/44 |
| 6,829,729 | B2 | * | 12/2004 | Hicks et al. ...................... 714/30 |
| 6,901,537 | B2 | * | 5/2005  | Dawkins et al. ................. 714/43 |
| 6,934,888 | B2 | * | 8/2005  | McIntosh et al. ................ 714/43 |
| 6,976,191 | B2 | * | 12/2005 | Kitamorn et al. ............... 714/43 |
| 7,137,020 | B2 | * | 11/2006 | Gilstrap et al. ................. 713/324 |
| 7,313,717 | B2 | * | 12/2007 | Vecoven et al. ................... 714/4 |
| 7,487,403 | B2 | * | 2/2009  | Hsu et al. ........................ 714/44 |
| 7,568,122 | B2 | * | 7/2009  | Mechalke et al. ................ 714/5 |
| 7,752,485 | B2 | * | 7/2010  | Bavaria et al. .................... 714/2 |
| 2002/0184576 | A1 | * | 12/2002 | Arndt et al. ..................... 714/48 |
| 2004/0139374 | A1 | * | 7/2004  | Meaney et al. .................. 714/48 |
| 2004/0210800 | A1 | * | 10/2004 | Ghislain Gabriel Vecoven et al. ............................... 714/47 |
| 2004/0221198 | A1 | * | 11/2004 | Vecoven ......................... 714/25 |
| 2004/0230861 | A1 | * | 11/2004 | Bailey et al. ...................... 714/6 |
| 2006/0184840 | A1 |   | 8/2006  | Floyd et al. |
| 2006/0212752 | A1 | * | 9/2006  | Mechalke et al. ................ 714/7 |
| 2008/0133962 | A1 |   | 6/2008  | Bofferding et al. |

FOREIGN PATENT DOCUMENTS

EP              0347558 A2    12/1989

* cited by examiner

*Primary Examiner* — Amine Riad
(74) *Attorney, Agent, or Firm* — Robert C. Rolnik; Libby Z. Toub (57) ABSTRACT

Disclosed is a computer implemented method, data processing system, and apparatus to respond to detection of a hardware interface error on a system bus, for example, during a concurrent maintenance operation. The service processor may receive an error on the system bus. The error identifies at least one field replaceable unit and may inhibit the suppression of clock signal to the field replaceable unit. The service processor adds an identifier of the field replaceable unit to an eligible Field Replaceable Unit (FRU) list. The service processor recursively adds at least one field replaceable unit that the field replaceable unit depends upon. The service processor suppresses the clock signal to the field replaceable unit. The service processor inhibits tagging the field replaceable unit as unusable for next initial program load.

25 Claims, 4 Drawing Sheets

HARDWARE RECOVERY RESPONSIVE TO CONCURRENT MAINTENANCE

BACKGROUND OF THE INVENTION

1. Field of the Invention

The present invention relates generally to a computer implemented method, data processing system, and computer program product for reconfiguring a data processing system. More specifically, the present invention relates to minimizing impacts of errors discovered in a concurrent maintenance operation on the larger data processing system.

2. Description of the Related Art

Data center managers typically rely on servers that are expected to have a 100% uptime. As a way to allow for repairs and upgrades of components of a server, engineers have designed such a server to accommodate field replaceable units. Advanced field replaceable units are configured to respond to concurrent maintenance operations. A concurrent maintenance operation is the addition, repair, or reconfiguration of a field replaceable unit (FRU) while the system that it is attached to, or to which the FRU is about to become attached, is running.

SUMMARY OF THE INVENTION

The present invention provides a computer implemented method, data processing system, and apparatus to respond to detection of a hardware interface error on a system bus, for example, during a concurrent maintenance operation. The service processor may receive an error on the system bus. The error identifies at least one field replaceable unit and inhibits the suppression of clock signal to the field replaceable unit. The service processor adds an identifier of the field replaceable unit to an eligible Field Replaceable Unit (FRU) list. The service processor recursively adds at least one field replaceable unit that the field replaceable unit depends upon. The service processor suppresses the clock signal to the field replaceable unit. The service processor inhibits tagging one or more field replaceable units as unusable for next initial program load.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
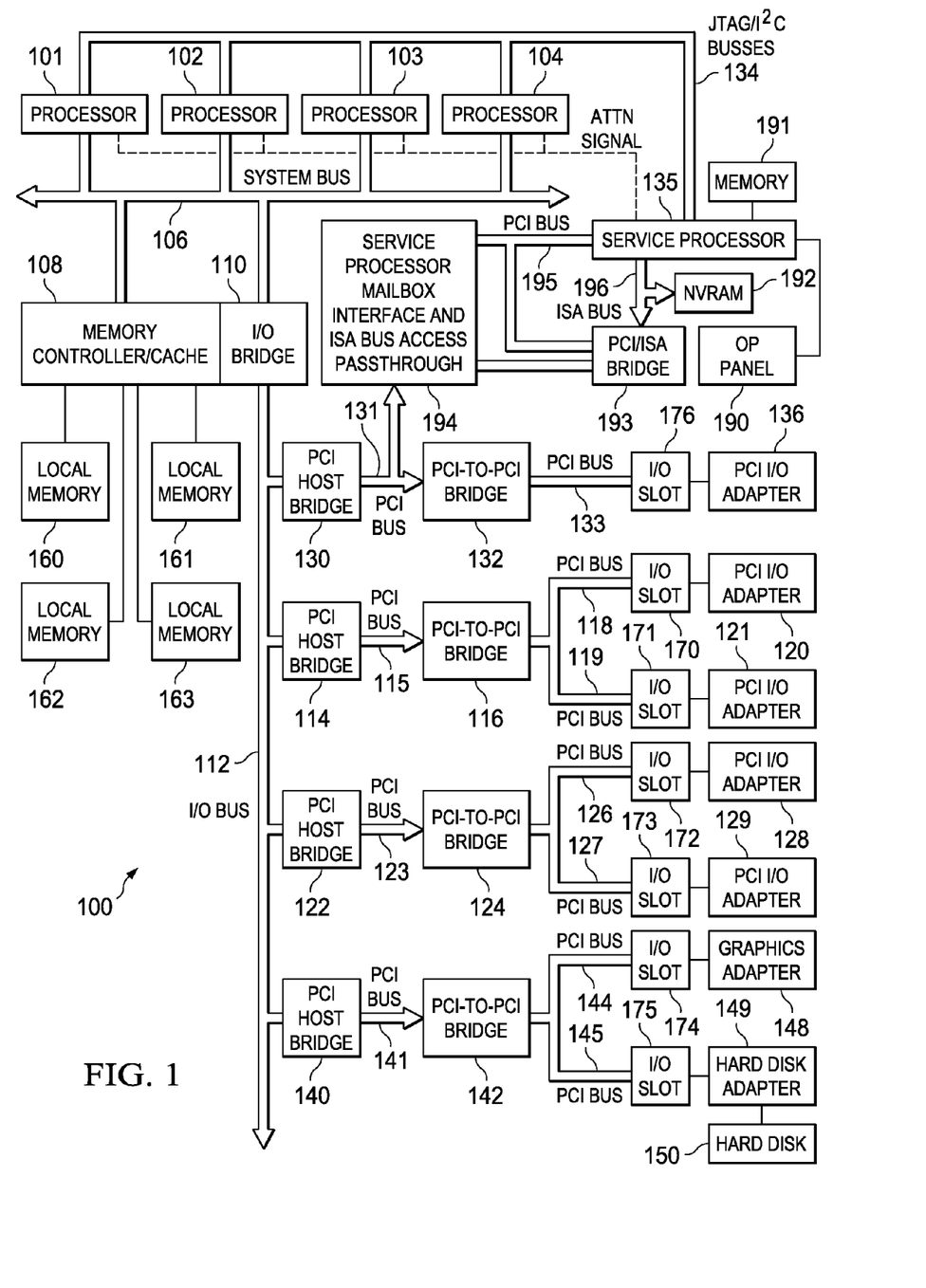
FIG. 1 is a block diagram of a data processing system in accordance with an illustrative embodiment of the invention.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned (LPAR) data processing system. Thus, data processing system 100 may have multiple heterogeneous operating systems or multiple instances of a single operating system running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1. Also for example, processors 102-103, some portion of memory from local memories 160-163, and PCI I/O adapters 121 and 136 may be assigned to logical partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance or image of the AIX operating system may be executing within partition P2, and a Linux™ operating system may be operating within logical partition P3. AIX is a registered trademark of International Business Machines Corporation. Linux is a trademark of Linus Torvalds.

Peripheral component interconnect (PCI) host bridge 114 connected to I/O bus 112 provides an interface to PCI local bus 115. A number of PCI input/output adapters 120-121 connects to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters, that is, expansion slots for add-in connectors. Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132. Service processor mailbox interface and ISA bus access pass-through logic 194 forwards PCI accesses destined to the PCI/ISA bridge 193. NVRAM storage 192, also known as non-volatile RAM, connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses, as defined by Institute for Electrical and Electronics Engineers standard 1149.1, and Philips I2C busses. However, alternatively, JTAG/I2C busses 134 may be replaced by only Philips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful or valid configuration of system resources is still possible after taking out the elements found to be faulty during the BISTs, BATs, and memory tests, then data processing system 100 is allowed to proceed to load executable code into local or host memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 includes, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and determine that this condition is predictive of a hard failure. Based on this determination, service processor 135 may mark that processor or other resource for deconfiguration in future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
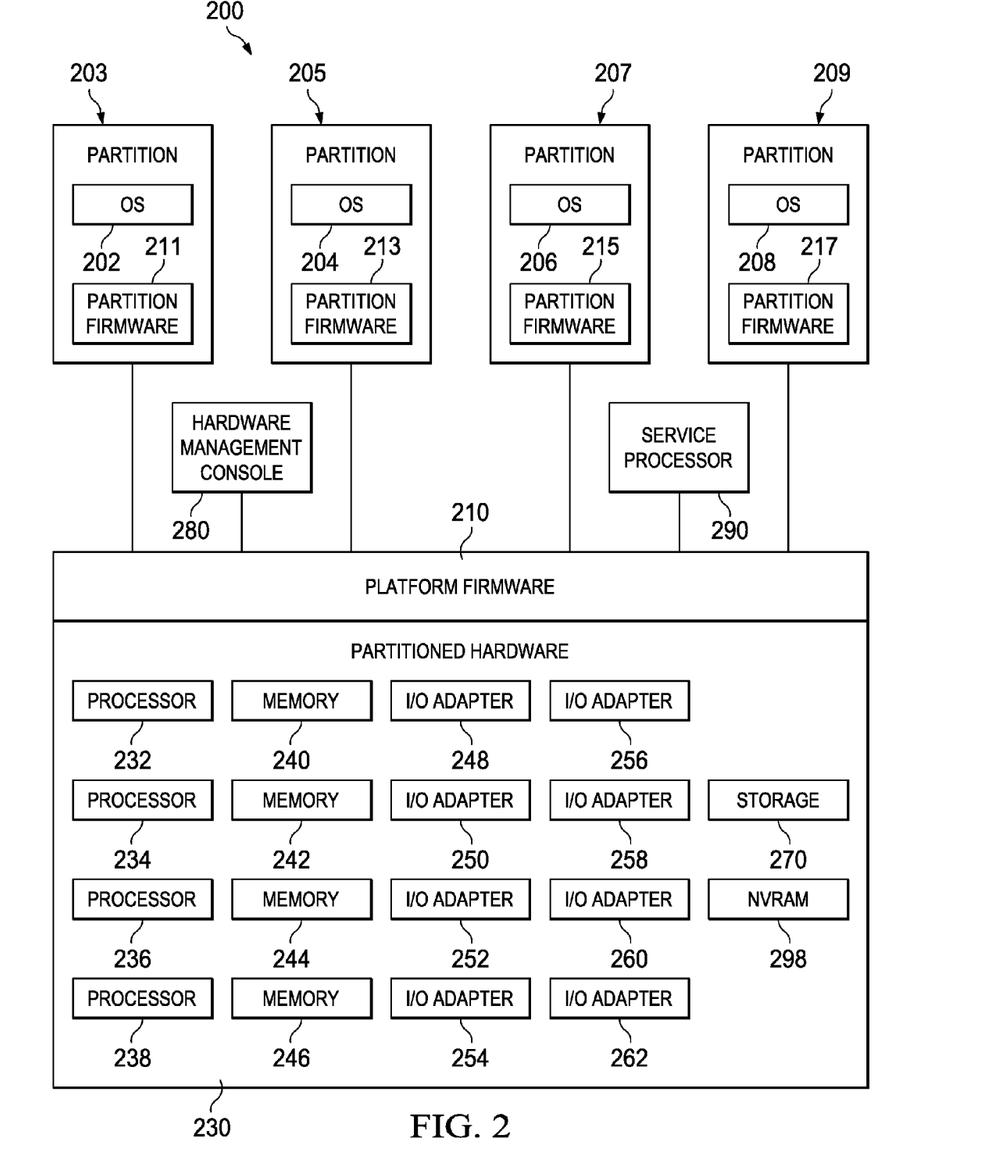
FIG. 2 is a block diagram of an exemplary logical partitioned platform in accordance with an illustrative embodiment of the invention.

With reference now to FIG. 2, a block diagram of an exemplary logical partitioned platform is depicted in which the present invention may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as a Hypervisor. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial bootstrap code, IEEE-1275 Standard Open Firmware, and runtime abstraction software (RTAS), which is available from International Business Machines Corporation. When partitions 203, 205, 207, and 209 are instantiated, a copy of bootstrap code is loaded onto partitions 203, 205, 207, and 209 by platform firmware 210. Thereafter, control is transferred to the bootstrap code with the bootstrap code then loading the open firmware and RTAS. The processors associated or assigned to the partitions are then dispatched to the partition's memory to execute the partition firmware.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware-implemented virtual machine identical to the underlying hardware. Thus, partition management firmware 210 allows the simultaneous execution of independent operating system images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module", or "system." Furthermore, the present invention may take the form of a computer program product embodied in any tangible medium of expression having computer usable program code embodied in the medium.

Any combination of one or more computer-readable, tangible storage devices may be utilized. The computer-readable, tangible storage device may be, for example but not limited to, an electronic, magnetic, optical, electromagnetic, infrared, or semiconductor system, apparatus, or device. More specific examples (a non-exhaustive list) of the computer-readable, tangible storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-readable, tangible storage devices could even be paper or another suitable device upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-readable, tangible storage devices may be any device that can contain, store, communicate, propagate, or transport the program for use by or in connection with the instruction execution system, apparatus, or device. The computer-usable device may include a propagated data signal with the computer-usable program code embodied therewith, either in baseband or as part of a carrier wave. The computer usable program code may be transmitted using any appropriate device, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The aspects of the illustrative embodiments permit a user to continue operations on an active FRU that communicates or otherwise corresponds to a FRU that is receiving a concurrent maintenance operation. Accordingly, a central electronics complex (CEC) may not suffer from performance degradation in response to a failure on a FRU received during concurrent maintenance. In addition, one or more embodiments may permit the active FRU to be treated as configured and operational for purposes of performing an initial program load.

Figure 3:
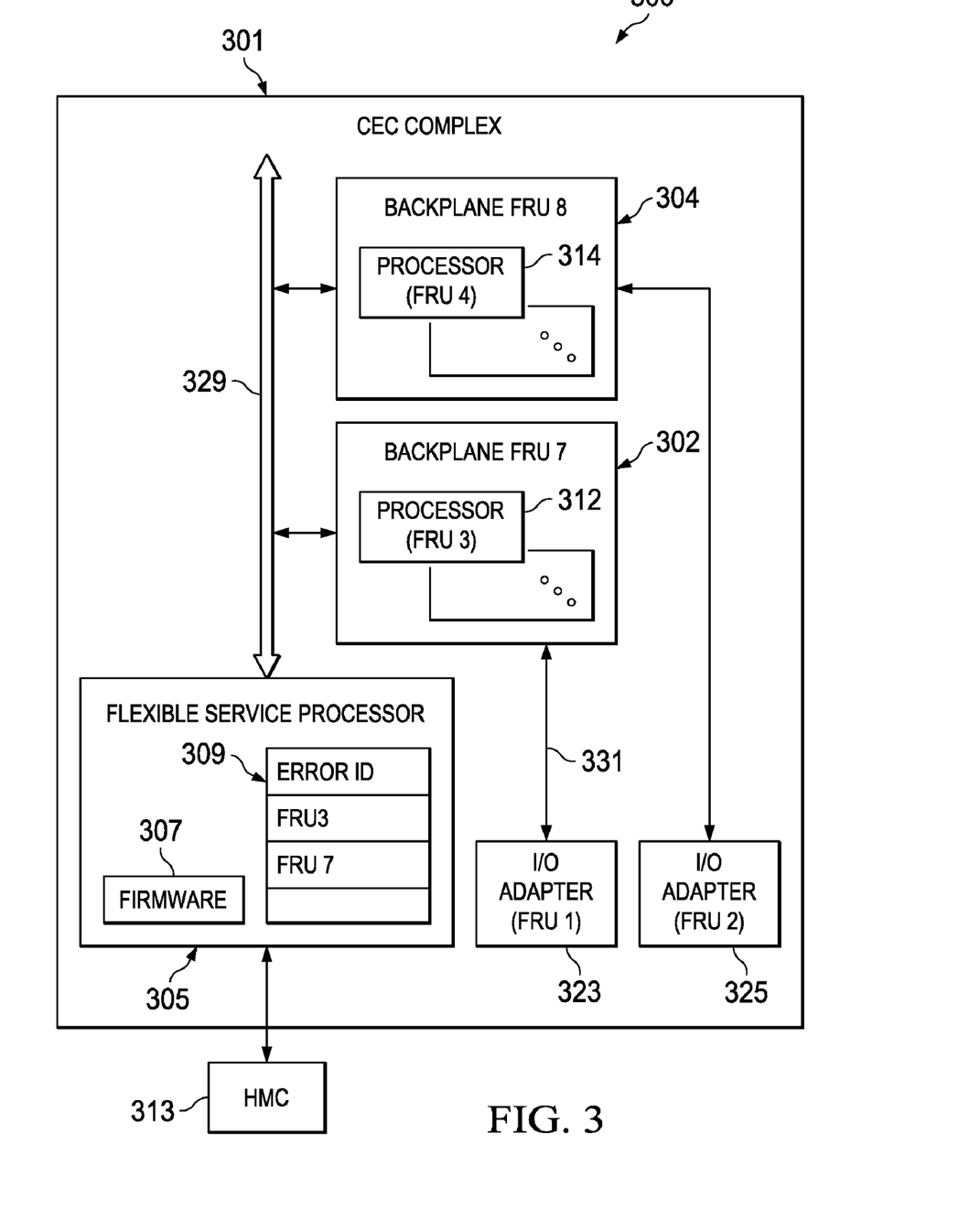
FIG. 3 is a block diagram of a data processing system that may be receiving a concurrent maintenance in accordance with an illustrative embodiment of the invention.

FIG. 3 is a block diagram of a data processing system 300 that may be receiving a concurrent maintenance in accordance with an illustrative embodiment of the invention. FIG. 3 may be an early form of the data processing system of FIG. 1. That is, data processing system 300 may be capable of receiving upgrades to reconfigure data processing system 300 to become data processing system 100. Accordingly, flexible service processor 305 may perform error detection and recovery functions for a data processing system such as a Central Electronics Complex (CEC). An error is an invalid state for a field replaceable unit (FRU) or other component of a data processing system. Errors may be, for example, CEC Concurrent Maintenance (CCM) recoverable error, a CCM unrecoverable error, a CCM critical error, among others.

For example, CEC complex 301 may include two backplanes, backplane 302 and backplane 304, which each are identified using "FRU 7" and "FRU 8", respectively. An identifier of a field replaceable unit is an identifier that uniquely identifies the FRU as a component to the data processing system. Similarly, each backplane includes at least one processor, for example, processor 312 (FRU 3) and processor 314 (FRU 4), respectively. In this configuration, backplane 302 is a supporting field replaceable unit to processor 312. A supporting field replaceable unit is a field replaceable unit, which provides electrical interconnections and/or mechanical support required for a supported field replaceable unit to function. In this case, the backplane 302 provides a slot and other supporting features to support processor 312, the supported field replaceable unit.

Each backplane may communicate across a bus to reach an I/O adapter. I/O adapter 323 may attach to bus 331 that couples to backplane 302. Bus 331 may couple to backplane 302 by way of a bus interface. A bus interface can be, for example, an I/O controller hub (ICH), peripheral component interconnect (PCI) host bridge, and the like. Similarly, I/O adapter 325 may attach to a bus that couples to backplane 304. Further, flexible service processor 305, may communicate to backplanes and supported FRUs via bus 329. Flexible service processor 305 may rely on firmware 307 to provide machine instructions to control the manner of configuring and testing of FRUs of the CEC complex 301. For example, firmware may access FRU list 309, explained below, that may provide details concerning FRUs that are subject to a concurrent maintenance. In addition, a client, for example, Hardware Management Console (HMC) 313 may be used to control the operations and steps taken when performing concurrent maintenance on CEC complex 301. A client can be a workstation that allows a system administrator to configure and manage partitions as well as perform maintenance on FRUs present and to be added to a data processing system configuration.

Figure 4:
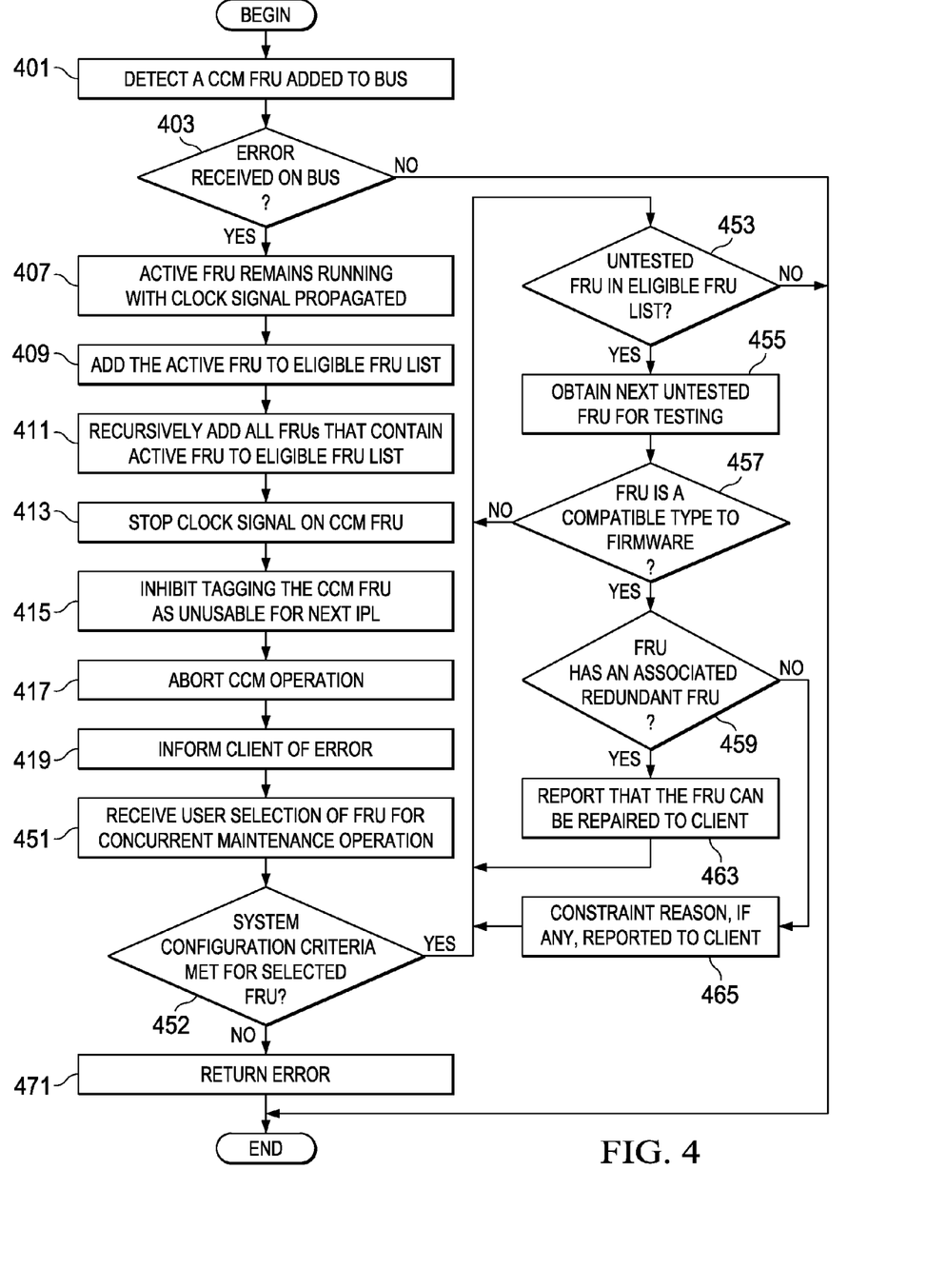
FIG. 4 is a flowchart of steps to handle errors that can occur during a concurrent maintenance operation in accordance with an illustrative embodiment of the invention.

FIG. 4 is a flowchart of steps to handle errors that can occur during a concurrent maintenance operation in accordance with an illustrative embodiment of the invention. A concurrent maintenance may be an addition of an I/O adapter, such as, for example, I/O adapter 323 of FIG. 3. In this case, I/O adapter 323 is a Central Electronics Complex (CEC) Concurrent Maintenance (CCM) field replaceable unit or CCM FRU. A CCM FRU is a FRU that is the target of a concurrent maintenance. Processor 312 also of FIG. 3 may be an active FRU. An active FRU is a FRU that is configured and operating within a Central Electronics Complex (CEC).

A service processor, for example, flexible service processor 305 of FIG. 3 detects a CCM FRU was added to a bus (step 401). The bus is, for example, bus 329, also of FIG. 3. The service processor may determine if an error is received on the bus (step 403). The error may be generated in association with a concurrent maintenance operation. A negative determination at step 403 may result in processing terminating thereafter. If an error is received on the bus, the service processor may inhibit the suppression of a clock signal to the active FRU. Accordingly, the active FRU remains running with the clock signal continuing to propagate (step 407).

Next, the service processor may add the active FRU to an eligible FRU list (step 409). An eligible Field Replaceable Unit (FRU) list is a data structure that associates an error identifier to a FRU identified in the error. In addition, the eligible FRU list may also associate a supporting field replaceable unit to the error identifier. The eligible FRU list may be, for example, eligible FRU list 309 of FIG. 3. FRUs listed in the eligible FRU list may be usable by the next initial program load (IPL).

Next, the service processor may recursively add all FRUs that are supporting FRUs to the active FRU (step 411). Accordingly, in the case that processor 312 is the active FRU, the service processor may add backplane 302 to the eligible FRU list. Thus, the eligible FRU list may include an error identifier, as well as one or more FRU determined to either be in error or support an FRU that is in error. Such FRUs, in this example, can be "FRU 3" and "FRU 7". Next, the service processor may stop the clock signal on the CEC Concurrent Maintenance (CCM) FRU (step 413). The service processor may stop clock signals by cooperatively instructing a FRU to stop clocks generated within the FRU or propagated through the FRU. For example, the service processor can write to a register within an integrated circuit installed on the FRU. Such a register may be dedicated to indicating a clock status for further action to be performed by circuits of the FRU The service processor may inhibit tagging the CCM FRU as unusable for a next initial program load (step 415). To the extent that the service processor relies on a table or other data structure to identify FRUs as unusable, the service processor avoids adding the CCM FRU to such a data structure. Unusable means that the CCM FRU is not associated with or selectable by any processes to configure the FRU active by the service processor. Next, the service processor may abort the CCM operation (step 417). Processing may terminate thereafter, if the CCM operation is aborted. For example, if the I/O adapter 323 is being added, the service processor may abort this operation. Accordingly, the service processor may associate the FRU associated with the aborted CCM operation with a bit setting, which signals that the FRU suffered from a CCM unrecoverable error.

Next, the service processor may inform the client of the error that the service processor received (step 419). The client may be a hardware maintenance console, for example. Accordingly, a user, who accesses such a console, may determine a current state of the central electronics complex.

Next, the service processor receives a user selection of a FRU for a second concurrent maintenance operation (step 451). A user selection is a user input to a client or any signals propagated to a service processor based on a user input to the client. Next, the service processor determines if the system configuration criteria is met for the selected FRU (step 452). System configuration criteria can include a test of whether the selected FRU is in the eligible FRU list. Accordingly, if the selected FRU fails to be found in the eligible FRU list, the system configuration criteria may not be met. On the other hand, if the system configuration criteria are met, the service processor determines if an untested FRU is in the eligible FRU list (step 453). An FRU is an untested FRU when it has not been tested during the interval between user selection at step 451 through step 465. System configuration criteria is one or more tests or determinations that indicate that the data processing system is configured to perform concurrent maintenance and/or if hardware support, for example, redundancy is present to allow concurrent maintenance to be performed. System configuration criteria can be tested in step 452 or steps 457 and 459, explained below, or any combination of steps 452, 457, and 459. If the system configuration criteria are met, the service processor may obtain the next untested FRU for testing (step 455). Next, the service processor determines if the FRU is a compatible type to firmware (step 457). If the FRU is not a compatible type, processing may resume at step 453.

Otherwise, the service processor determines if the FRU has an associated redundant FRU (step 459). If the result to step 459 is negative, the service processor determines if a constraint reason exists, and reports one, if it exists, to the client (step 465). Further processing may continue at step 453. However, if the result to step 459 is positive, the service processor reports that the FRU can be repaired to the client (step 463). Further processing may continue at step 453. The client may be, for example, HMC 313 of FIG. 3. Repairs can include, for example, retrying the command or operation, displaying a message to user, logging the error and continuing with the CCM operation. A user that receives information concerning the status of the FRU as being repairable may perform further tests and repairs to the FRU in response to such a report. A further test can be replacing the applicable FRU. Thus, step 463 may prompt the user physically to replace the FRU. A repair coordinated by the user can be a new CCM operation with the FRU.

A failure to determine that a system configuration criterion is met at step 452 can cause the service processor to return an error (step 471). During this step, the service processor may signal to the client the status of the system configuration criteria. Following step 471, processing may terminate.

The illustrative embodiments permit a user to continue operations on an active FRU that communicates or otherwise corresponds to a FRU that is in an error state. Accordingly, a central electronics complex (CEC) concurrent maintenance (CCM) may not suffer from performance degradation in response to a failure of a FRU that receives concurrent maintenance. In addition, one or more embodiments may permit the active FRU to be treated as configured and operational for purposes of performing an initial program load.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method to respond to a hardware interface error on a system bus, the method comprising:
   receiving, by a service processor, an error on the system bus, the error identifying at least one first field replaceable unit;
   inhibiting, by the service processor, the suppression of clock signal to the at least one first field replaceable unit;
   adding, by the service processor, an identifier of the at least one first field replaceable unit to an eligible Field Replaceable Unit (FRU) list;
   responsive to the at least one first field replaceable unit being dependent on a supporting field replaceable unit, adding, by the service processor, at least the supporting field replaceable unit to the eligible FRU list;
   suppressing, by the service processor, the clock signal to the at least one first field replaceable unit; and
   inhibiting tagging the at least one first field replaceable unit as unusable, by the service processor, for next initial program load.

2. The method of claim 1, further comprising:
   aborting a concurrent maintenance operation corresponding to the error; and
   informing a client of the error.

3. The method of claim 2, further comprising:
   receiving a user selection of a second field replaceable unit for a second concurrent maintenance operation;
   determining whether a system configuration criteria is met based on the user selection; and
   responsive to a determination that the system configuration criteria is met, testing the second field replaceable unit.

4. The method of claim 3, wherein the second field replaceable unit is the at least one first field replaceable unit.

5. The method of claim 3, wherein testing further comprises reporting a test outcome to a client.

6. The computer implemented method of claim 3, wherein determining whether a system criteria is met further comprises determining whether the second field replaceable unit is compatible to a firmware in a flexible service processor.

7. The computer implemented method of claim 3, wherein determining whether a system criteria is met further comprises determining whether the second field replaceable unit is associated with a redundant field replaceable unit corresponding to the second field replaceable unit, and the system configuration criteria is met based on the second field replaceable unit being configured active.

8. The method of claim 7, wherein the second field replaceable unit is a supporting field replaceable unit, and wherein inhibiting tagging the at least one first field replaceable unit comprises inhibiting the supporting field replaceable unit.

9. The method of claim 1, further comprising:
   receiving a user selection of a second field replaceable unit for a second concurrent maintenance operation;
   determining whether a system configuration criteria is met based on the user selection;
   responsive to a determination that the system configuration criteria is met, obtaining a next untested field replaceable unit for testing; and
   responsive to a determination that the system configuration criteria is met, testing the second field replaceable unit.

10. A computer program product for responding to a hardware interface error on a system bus, the computer program product comprising:
    a computer readable medium having computer readable program code embodied therewith, the computer program product comprising:
    computer readable program code configured to receive an error on the system bus, the error identifying at least one first field replaceable unit;
    computer readable program code configured to inhibit the suppression of clock signal to the at least one first field replaceable unit;
    computer readable program code configured to add an identifier of the at least one first field replaceable unit to an eligible Field Replaceable Unit (FRU) list;
    computer readable program code, responsive to the at least one first field replaceable unit being dependent on a supporting field replaceable unit, to add at least one first field replaceable unit that the at least one first field replaceable unit depends upon;
    computer readable program code configured-to suppress the clock signal to the at least one first field replaceable unit; and
    computer readable program code configured to inhibit tagging the at least one first field replaceable unit as unusable for next initial program load.

11. The computer program product of claim 10, further comprising:
    computer readable program code configured to abort a concurrent maintenance operation corresponding to the error; and
    computer readable program code configured to inform a client of the error.

12. The computer program product of claim 11, further comprising:
    computer readable program code configured to receive a user selection of a second field replaceable unit for a second concurrent maintenance operation;
    computer readable program code configured to determine whether a system configuration criteria is met based on the user selection; and
    computer readable program code configured to test the second field replaceable unit, responsive to a determination that the system configuration criteria is met.

13. The computer program product of claim 12, wherein the second field replaceable unit is the at least one first field replaceable unit.

14. The computer program product of claim 12, wherein testing further comprises reporting a test outcome to a client.

15. The computer program product of claim 12, wherein determining whether a system criteria is met further comprises determining whether the second field replaceable unit is compatible to a firmware in a flexible service processor.

16. The computer program product of claim 12, wherein determining whether a system criteria is met further comprises determining whether the second field replaceable unit is associated with a redundant field replaceable unit corresponding to the second field replaceable unit, and the system configuration criteria is met based on the second field replaceable unit being configured active.

17. The computer program product of claim 16, wherein the second field replaceable unit is a supporting field replaceable unit.

18. The computer program product of claim 10, further comprising:
computer readable program code configured to receive a user selection of a second field replaceable unit for a second concurrent maintenance operation;
computer readable program code configured to determine whether a system configuration criteria is met based on the user selection;
computer readable program code configured to obtain a next untested field replaceable unit for testing, responsive to a determination that the system configuration criteria is met; and
computer readable program code configured to test the second field replaceable unit, responsive to a determination that the system configuration criteria is met.

19. A data processing system comprising:
a bus;
a storage device connected to the bus, wherein computer usable code is located in the storage device;
a communication unit connected to the bus; and
a processing unit connected to the bus, wherein the processing unit executes the computer usable code for detecting a hardware interface error on a system bus, wherein the processor executes computer usable code to receive an error on the system bus, the error identifying at least one first field replaceable unit; inhibit the suppression of clock signal to the at least one first field replaceable unit; add an identifier of the at least one first field replaceable unit to an eligible Field Replaceable Unit (FRU) list; responsive to the at least one first field replaceable unit being dependent on a supporting field replaceable unit add at least one first field replaceable unit that the at least one first field replaceable unit depends upon; suppress the clock signal to the at least one first field replaceable unit; and inhibit tagging the at least one first field replaceable unit as unusable for next initial program load.

20. The data processing system claim 19, wherein the processor further executes computer usable code to abort a concurrent maintenance operation corresponding to the error; and
inform a client of the error.

21. The data processing system claim 20, wherein the processor further executes computer usable code to receive a user selection of a second field replaceable unit for a second concurrent maintenance operation;
determine whether a system configuration criteria is met based on the user selection; and
test the second field replaceable unit, responsive to a determination that the system configuration criteria is met.

22. The data processing system claim 21, wherein the second field replaceable unit is the at least one field replaceable unit.

23. The data processing system claim 21, wherein testing further comprises reporting a test outcome to a client.

24. The data processing system claim 19, wherein the processor further executes computer usable code to receive a user selection of a second field replaceable unit for a second concurrent maintenance operation;
determine whether a system configuration criteria is met based on the user selection;
obtain a next untested field replaceable unit for testing, responsive to a determination that the system configuration criteria is met; and
test the second field replaceable unit, responsive to a determination that the system configuration criteria is met.

25. A method to respond to a hardware interface error on a system bus, the method comprising:
receiving, by a service processor, an error on the system bus, the error identifying at least one first field replaceable unit;
inhibiting, by the service processor, the suppression of clock signal to the at least one first field replaceable unit;
adding, by the service processor, an identifier of the at least one first field replaceable unit to an eligible Field Replaceable Unit (FRU) list;
responsive to the at least one first field replaceable unit being dependent on a supporting field replaceable unit, adding, by the service processor, at least the supporting field replaceable unit to the eligible FRU list;
suppressing, by the service processor, the clock signal to the at least one first field replaceable unit;
inhibiting, by the service processor, tagging the at least one first field replaceable unit as unusable for next initial program load;
receiving, by the service processor, a user selection of a second field replaceable unit for a second concurrent maintenance operation;
determining, by the service processor, whether a system configuration criteria is met based on the user selection, wherein determining whether a system criteria is met further comprises determining whether the second field replaceable unit is associated with a redundant field replaceable unit corresponding to the second field replaceable unit, and the system configuration criteria is met based on the second field replaceable unit being configured active; and
responsive to a determination that the system configuration criteria is met, testing, by the service processor, the second field replaceable unit, wherein inhibiting tagging the at least one first field replaceable unit comprises inhibiting the supporting field replaceable unit.

* * * * *